United States Patent
Alff

(10) Patent No.: US 12,427,810 B2
(45) Date of Patent: Sep. 30, 2025

(54) METHOD FOR OBTAINING THE DISTANCE TRAVELLED BY A ROLLING TIRE

(71) Applicant: COMPAGNIE GENERALE DES ETABLISSEMENTS MICHELIN, Clermont-Ferrand (FR)

(72) Inventor: Denis Alff, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 473 days.

(21) Appl. No.: 17/784,277

(22) PCT Filed: Dec. 10, 2020

(86) PCT No.: PCT/FR2020/052368
§ 371 (c)(1),
(2) Date: Jun. 10, 2022

(87) PCT Pub. No.: WO2021/116610
PCT Pub. Date: Jun. 17, 2021

(65) Prior Publication Data
US 2023/0041164 A1 Feb. 9, 2023

(30) Foreign Application Priority Data
Dec. 12, 2019 (FR) .................... 1914223

(51) Int. Cl.
*B60C 11/24* (2006.01)
*B60C 19/00* (2006.01)
*B60C 23/04* (2006.01)

(52) U.S. Cl.
CPC .......... *B60C 11/243* (2013.01); *B60C 11/246* (2013.01); *B60C 19/00* (2013.01); *B60C 23/0488* (2013.01); *B60C 2019/004* (2013.01)

(58) Field of Classification Search
CPC ..... B60C 11/243; B60C 11/246; B60C 19/00; B60C 23/0488; B60C 2019/004; B60C 11/24; G01C 22/00
See application file for complete search history.

(56) References Cited

U.S. PATENT DOCUMENTS 9,050,865 B2   6/2015  Kammann
9,566,834 B2   2/2017  Kandler et al.
(Continued)

FOREIGN PATENT DOCUMENTS

EP   3299765 A1     3/2018
EP   3489044 A1     5/2019
WO   2019/101849 A1 5/2019

OTHER PUBLICATIONS

International Search Report dated Mar. 22, 2021, in corresponding PCT/FR2020/052368 (5 pages).

*Primary Examiner* — Stephen D Meier
*Assistant Examiner* — Leo T Hinze
(74) *Attorney, Agent, or Firm* — VENABLE LLP

(57) ABSTRACT

A method for obtaining the distance travelled by a tire comprises fixing a sensor, to the right of the crown with a radial position Rc, capable of generating a signal proportional to the acceleration experienced; rolling the tire at a rotation speed W, subject to a load Z; acquiring, after a time T, a first signal $Sig^i$ comprising the acceleration amplitude in the direction normal to the crown, wherein the values below a threshold N represent less than 40 percent of the length of the first signal; identifying a reference value $V_i^{reference}$, being the square root of the average value of the first signal $Sig^i$; and determining the distance travelled D during the time T from the following formula: $D = A*T*V_i^{reference}$, where A is proportional to the square root of the rolling radius of the tire.

15 Claims, 4 Drawing Sheets

(56) References Cited

U.S. PATENT DOCUMENTS

| | | |
|---|---|---|
| 10,077,982 B2 | 9/2018 | Chekanov et al. |
| 10,906,363 B2 | 2/2021 | Yu et al. |
| 2011/0166825 A1* | 7/2011 | Kammann ............. G01C 22/02 |
| | | 73/146 |
| 2014/0107946 A1 | 4/2014 | Kandler et al. |
| 2018/0087905 A1 | 3/2018 | Chekanov et al. |
| 2019/0160894 A1 | 5/2019 | Yu et al. |
| 2021/0199686 A1* | 7/2021 | Honda .................... G01P 15/08 |
| 2022/0080789 A1 | 3/2022 | Alff |
| 2022/0080790 A1 | 3/2022 | Alff |

* cited by examiner

METHOD FOR OBTAINING THE DISTANCE TRAVELLED BY A ROLLING TIRE

FIELD OF THE INVENTION

The present invention relates to methods for obtaining the distance travelled by a tyre casing of a mounted assembly under its conditions of use.

TECHNOLOGICAL BACKGROUND

Knowledge of the total distance travelled by a tyre casing is important to the evaluation of the state of the latter, both in terms, for example, of its wear and of its ageing. It is an easily accessible quantity that is a reflection of the state of the tyre casing. Thus, knowledge of this quantity makes it possible to plan maintenance operations on the tyre casing, in order to inspect the tyre casing or even to replace the tyre casing in order to preserve the mobility of the vehicle equipped with the tyre casing. Of course, knowledge of this quantity is more valuable to the tyre maker that designed and manufactured the tyre casing since it is the most qualified to evaluate the state of the latter. Lastly, this total distance travelled is the sum of distances travelled regularly in the course of the life of the tyre casing. Access to this regularly travelled distance also provides a good indicator of the state of the tyre casing, especially with regard to predicting the lifetime of the latter.

In the prior art, there are two main families of devices for evaluating the distance travelled, which are an upshot of the configuration of the mounted assembly. Thus, document U.S. Pat. No. 9,566,834B2 discloses a TPMS device, which is mounted on the wheel of the mounted assembly, that allows the mileage travelled by the mounted assembly to be determined via correct evaluation of the centrifugal forces measured by an accelerometer. In this case, it is necessary for the accelerometer to be mounted on the wheel of the mounted assembly, which is a non-deformable solid. In addition, the signals from the accelerometer must be corrected for the temperature of the mounted assembly, which temperature is measured in the TPMS device.

The drawback of this device is that it is necessary to provide a TPMS (acronym of tyre pressure monitoring system) that in addition measures acceleration and that is mounted on the wheel, on the valve rim for example. Under extreme conditions of use, due to the heat generated by the brake disc, a correction for temperature is required due to the heat exchange between the brake disc and the wheel. Lastly, this device requires an accelerometer to be used to this end alone, this being expensive even though an accelerometer may be used to detect whether the mounted assembly is rotating or stationary in order to save device power when stationary.

Among devices of the second family, mention may be made of document U.S. Pat. No. 9,050,865B2, which proposes placing an accelerometer, included in a TMS (acronym of tyre monitoring system), on the tread of the tyre casing with a view to evaluating the distance travelled by the tyre casing. Operation then consists in evaluating the number of wheel revolutions over a time period, allowing distance travelled and average rotational speed to be evaluated. The measurement must be reiterated after a certain time period. Between two measurement phases, the rotational speed of the tyre casing is estimated, for example via an interpolation between the two measurement phases. To detect the number of wheel revolutions, it is recommended to employ at least one shock-sensing accelerometer to record the large variations in acceleration that appear on entry into and exit from the contact patch, which corresponds to the area of contact of the tread of the tyre casing with the ground. Thus, an absolute value of the radial acceleration is by no means necessary. However, the angular precision of detection of the contact-patch length allows an estimate of the load borne by the mounted assembly to be obtained.

The drawback of such a device resides in the angular precision required in respect of detection of the entry into and the exit from the contact patch. In addition, the power consumption of the system is high. It is necessary to evaluate various time periods, those of the measurement phases and those between the measurements, and to compute the number of revolutions of the mounted assembly, this number being computed based on the rotational speeds of each measurement phase and on the duration of the period in which no measurements are taken. Although the result is accurate and no accelerometric sensor is required to measure true acceleration, the system does not lend itself well to a long measuring-device power-source lifetime. Moreover, since the power source, generally a battery, is located externally radially with respect to the axis of rotation of the tyre casing, it is generally small and therefore of low capacity, to decrease centrifugal forces, this meaning that the device does not lend itself well to use in real life, especially in long-life tyre casings.

The present invention relates to a method for obtaining the distance travelled by a tyre casing comprising an electronic device mounted on the tyre casing plumb with the crown, which method is energy efficient and carried out in real time, the distance travelled being able to be obtained in the electronic device directly.

SUMMARY OF THE INVENTION

The invention relates to a method for obtaining the distance travelled by a tyre casing in a state mounted on-wheel in order to form a mounted assembly, said tyre casing having a crown equipped with a tread able to make contact with the ground, two sidewalls and two beads of revolution about a natural axis of rotation and a median plane, the intersection of the median plane and of the natural axis of rotation defining a wheel centre, comprising the following steps:
fastening to the tyre casing plumb with the crown at least one sensor having a radial position $R_C$ with respect to the natural axis of rotation in its on-wheel mounted state and able to generate at least one output signal proportional to the acceleration experienced by said sensor in the tyre casing;
placing the mounted assembly under conditions in which it may rotate at a rotational speed W, and is loaded with a load Z;
acquiring, after a time interval T, a first signal $Sig^i$ comprising at least the amplitude of the acceleration in the direction normal to the crown, values of the first signal $Sig^i$ less than a threshold N representing less than 40 percent of the length of the first signal $Sig^i$;
identifying a first reference quantity $V_i^{reference}$ defined as the square root of the mean value of the first signal $Sig^i$;
determining the distance D travelled during the time interval T using the following formula:

$$D = A * T * V_i^{reference} \qquad \text{[Math 1]}$$

where A is dependent on the tyre casing, and at least proportional to the square root of the rolling radius corresponding to the smallest distance between the wheel centre and the ground under loaded inflated conditions.

Optionally, the total distance $D_f$ travelled from a time t0 to a time t+T is determined using the following formula:

$$D_f = D_0 + D \quad \text{[Math 2]}$$

where $D_0$ is the total distance travelled by the tyre casing from the time t0 to the time t.

This method firstly allows the sensor to be installed plumb with the crown block, this allowing the sensor to be employed to other ends such as, for example, the estimation of the load borne by the mounted assembly. In addition, the remoteness of the sensor from heating elements of the vehicle such as the brake discs ensures a measurement of normal acceleration that is not affected by the temperature of the mounted assembly. Therefore, it is not necessary to correct the value of the normal acceleration for temperature. In addition, the system is energy efficient since the mathematical operations to be performed are limited to the computation of a comparison, of a summation, of a mean value and of a multiplication by a time period. Thus, it is entirely envisionable to carry out its operations within an electronic device integrated into the tyre casing, although it is also possible, using communication means, radiofrequency communication means for example, to transfer some of these operations to the vehicle or to a server. In this case, it is preferable for the periodicity of these radiofrequency communications to be higher than the periodicity between two measurement phases, above all if communication consumes a lot of power. Lastly, by guaranteeing that the values of the first signal $Sig^i$ are located above a threshold N at least proportionally, it is ensured that the estimation of the distance D travelled in the time period is realistic, or even of good quality. In addition, it is also guaranteed that the estimate of the distance travelled during said time period is significant. Specifically, the threshold N makes it possible to allow for measurement-system-related or ground-related signal perturbations. In addition, if the values of the first signal are mostly negative or close to the value zero, it is an indication of inconsistencies in the signal, or of a low centrifugal acceleration or of measurement at azimuths of the tyre casing corresponding to the contact patch. In all these cases, it is recommendable not to evaluate the distance travelled because it is not representative of reality. The threshold N allows these particular values of the first signal $Sig^i$ to be detected.

Positioning the sensor on the tyre casing next to the crown, contrary to prior-art document U.S. Pat. No. 9,566,834B2 which positions it on the wheel, adds a lot of noise to the accelerometric signal, especially due to the shocks recorded by the sensor as it enters into and exits from the contact patch, or to the roughness of the ground over which the mounted assembly is passing. For example, passage of the sensor through the contact patch results in a near-zero measured normal-acceleration value that is not at all representative of the centrifugal acceleration.

These effects are greatly attenuated when the sensor is installed on the wheel, which is an undeformable object with respect to the tyre casing under rolling conditions. Thus, whatever the angular position of the sensor at the time of recording of the signal, a good approximation of the centrifugal acceleration is obtained by improving the signal/noise ratio. This justifies the single measurement of normal acceleration taken in the prior-art document.

To overcome this difficulty, it is necessary, in order to obtain a realistic value of the centrifugal acceleration, to compute the mean of the normal accelerations of the sensor while the values below a threshold N are not in the majority in the first signal. For example, this threshold N is the value zero.

Lastly, the estimation of the distances D and $D_f$ travelled requires two variables to be known. The first is the time period T which has elapsed between two consecutive measurements. The second, the function A, is proportional to the square root of the rolling radius Rp. Here, by rolling radius Rp, what is meant is the smallest distance between the wheel centre and the exterior points of the mounted, loaded tyre casing under rolling conditions. Due to the compression of the tyre casing against the ground as a result of the application of the load Z, this distance is generally the orthogonal projection of the wheel centre onto the ground. Regarding the total distance Df travelled by the tyre casing since a time, denoted to, generally corresponding to its first use on the vehicle, it suffices to increment the distances travelled during each time period T' preceding the period T to obtain the distance D0, to which the distance D travelled during the period T must be added. Of course, these time periods T' are not necessarily identical or equal to the period T. Likewise, the function A of the tyre casing may change from one time period to the next as a result of factors external or internal to the mounted assembly.

Preferably, the time interval T remaining the same between each measurement, and preferably if it is not possible to obtain a first signal $Sig^i$ at a time t, the reference quantity $V_i^{reference}$ takes a set value $V^{set}$, and the total distance $D_f$ travelled by the tyre casing is determined using the following formula:

$$D_f = T * \sum_{i=0}^{n} \left( A * V_i^{reference} \right) \quad \text{[Math 3]}$$

Thus, it is possible to factor out the time period T from the summation. Thus, this decreases the number of computations to be performed, this being more economical in terms of power and time and making the method efficient in terms of computing time in an electronic device integrated into the tyre.

In addition, if a recording of the accelerometric signal is very noisy as a result of particular mechanical, thermal or electromagnetic stresses on the mounted assembly, it is possible to substitute a set value for the reference quantity for an isolated measurement, so as not to distort the total distance travelled. This set value may for example take the previous value of the reference quantity $V_{i-1}^{reference}$, or a fraction thereof or even the value zero.

Very preferably, the function A being a constant, the total distance travelled is determined using the following formula:

$$D_f = T * A * \sum_{i=0}^{n} V_i^{reference} \quad \text{[Math 4]}$$

Thus, it is possible to factor out the function A from the summation. Thus, this decreases the number of computations to be performed, this being more economical in terms of computing time and power and making the method efficient in an electronic device integrated into the tyre. To this end, it is necessary to make the approximation that the rolling radius $R_P$ does not vary over the lifetime of the tyre casing. It is then computed once and only once on the basis of the information contained in the markings of the tyre casing, by applying the computation rules of the ETRTO (acronym of European Tyre and Rim Technical Organisation). For example, the load Z applied to the tyre casing is that specified by the load index marked on the sidewall of the tyre casing and the computation rules of the ETRTO. In addition, the inflation pressure P if any is the recommended inflation pressure indicated on the sidewall and optionally by the computation rules of the ETRTO.

According to a specific embodiment, the first signal $Sig^i$ being demarcated over a number $N^{TdR}$ of wheel revolutions, $N^{TdR}$ being greater than or equal to 1, and $N^{TdR}$ preferably being an integer, in order to construct a wheel-revolution signal $Sig^{TdR}{}_i$, the reference quantity $V_i^{reference}$ is the square root of the mean value of the wheel-revolution signal $Sig^{TdR}$ over one revolution.

Here, because the first signal $Sig^i$ corresponds to at least one complete rotation of the mounted assembly, it is ensured that values of low level naturally represent less than 40 percent of the length of the first signal $Sig^i$. In addition, the average value of the acceleration normal to the crown over one wheel revolution is a quantity intrinsic to the rotation of the mounted assembly, this allowing the quality of the estimation of the distances travelled to be substantially improved, in particular over small distances, with regard to a daily evaluation for example. If the first signal $Sig^i$ is demarcated over a plurality of wheel revolutions, the repetition of the wheel revolutions allows the intrinsic quantity sought to be smoothed by decreasing the weight of the spatial discretization of recording of the first signal $Sig^i$. Thus, it is preferable for the first signal $Sig^i$ to represent a plurality of wheel revolutions, in order to improve the quality of the prediction. In addition, even if the signal does not represent an integer number of wheel revolutions, the remainder will not significantly affect the sought intrinsic quantity. Thus an approximation of very good quality of the distances travelled by the mounted assembly is obtained. Of course, in the absence of any remainder, apart from the discretization errors, this amounting to demarcating the first signal $Sig^i$ over an integer number of wheel revolutions, the sought intrinsic quantity is obtained with a better precision, leading to the best estimation of the distances travelled.

According to one particular embodiment, having identified a first series of increments I corresponding to the abscissa u of at least a first signal $Sig^i$ where the first signal $Sig^i$ crosses a threshold value B, the first signal $Sig^i$ is demarcated between a first increment Imin and a second increment Imax with max equal to min+2k, k being a strictly positive natural integer, over an integer number $N_{TdR}$ of wheel revolutions defined by the formula:

$$N_{TdR} = \frac{(max - min)}{2} \qquad [\text{Math 5}]$$

This is a simple way of demarcating the first signal $Sig^i$ over an integer number of wheel revolutions that minimizes complex operations on the values. It is efficient in terms of computation time and memory space, this allowing implementation in an electronic device integrated into the tyre casing while avoiding a high power consumption, thus allowing the size of the power source of the electronic device to be limited. Here, it is not sought to determine whether the threshold value B is crossed from above or below, rather, it is only noted that it is crossed. Thus, to demarcate the first signal $Sig^i$ over an integer number of wheel revolutions, only even or odd increments must be used. If the direction in which the threshold value B is crossed is evaluated, only abscissae u corresponding either to even or odd increments I would be identified directly. This is envisionable but the computational cost would be higher.

According to one very particular embodiment, the first series of increments I is identified using the combination of the following steps:
 defining the threshold value B, which is a value comprised between 0.1 and 0.5 of the at least one maximum of the at least one portion of the first signal $Sig^i$;
 determining a second signal of abscissa u depending on the at least one portion of the first signal $Sig^i$ and the threshold value B;
 identifying the first series of increments I corresponding to the abscissa u of the at least one portion of the first signal $Sig^i$ where the second signal crosses a threshold E, the second signal preferably being the difference between the first signal $Sig^i$ and the threshold value B, the threshold E is the value zero, or the second signal being the ratio between the first signal $Sig^i$ and the threshold value B, the threshold E is the value one.

This method may be easily implemented on an electronic device integrated into the tyre casing since the mathematical operations to be performed are elementary. The determination of the threshold value just requires the maximum value of one portion of the first signal $Sig^i$ to be retained. Specifically, in this way the specific form of the acceleration normal to the crown of a loaded, rotating tyre casing ensures that a threshold value B will be generated that will allow the portion of the first signal $Sig^i$ corresponding to the passage through the contact patch of the tyre casing to be removed. However, it is enough just to demarcate this region with respect to the other to position the increments I. Thereafter, the choice of the second function as being the difference or the ratio between the first signal and the threshold value allows data-manipulation times in the electronic device to be limited and elementary threshold-crossing functions to be used.

According to one advantageous embodiment, the identification of the increments comprises the following steps:
 creating a second series of increments J corresponding to an intermediate abscissa u, preferably located between one eighth and seven eighths, and very preferably located at the median length, of the length defined by the abscissae u of increments I of consecutive and identical parities, and
 constructing the wheel-revolution signal $Sig_{TdR}{}^i$ between a first increment $J_{min}$ and a second increment $J_{max}$, min and max being of same parity.

This embodiment allows the first signal to be demarcated over an integer number of wheel revolutions. However, this time the signal is not explicitly demarcated by an entry into or exit from the contact patch but by an intermediate position, very preferably opposite the contact patch. In fact, it is necessary to move away from the region corresponding both to the entry into and to the exit from the contact patch, which generates large variations in the normal acceleration of any point of the crown of the tyre casing. Thus, it is generally preferable for the intermediate point to be located between the first and the seventh eighth of a revolution defined by the increments I of identical parities. Therefore, the average value of the increments of the first signal $Sig^i$ is less sensitive to errors generated by the spatial discretization of the wheel revolution. Specifically, since the sensitivity of the normal acceleration at the entry into and exit from the contact patch is high, a small localization error results in large variations in the normal acceleration, and hence, to improve the precision of the estimate of the distance travelled, more measurement points must be averaged. In the case where the demarcations of the signal are located outside of the region of influence of the contact patch, the error due to the spatial discretization is less since the value recorded is generally close to the sought intrinsic value. Thus, it is easier to limit the length of the first signal $Sig^i$ to a single wheel revolution, this also limiting the number of measurement points.

Advantageously, the first signal $Sig^i$ is acquired if the rotational speed W of the tyre casing is greater than a threshold $W_{threshold}$ defined by the following formula:

$$W_{threshold} = \frac{12}{\sqrt{Dev}} \qquad \text{[Math 6]}$$

where Dev is the distance travelled by the tyre casing in one revolution.

Thus, if the rotational speed is above the threshold value, it is easy to dissociate the first signal $Sig^i$ with respect to the threshold value N, however unforeseeably; the first signal $Sig^i$ varies as a result, for example, of a roadway of high macro-roughness, of electromagnetic interference affecting the measurement system, and/or of vibrations in the tyre casing. When this threshold $W_{threshold}$ is not reached, it is possible to employ, as reference quantity $V^i_{reference}$, a set value $V_{set}$ that may be the value zero.

The reference acceleration $\gamma^{reference}$ corresponds to a neutral state of the tyre casing, i.e. to a state in which the load is zero. In practice, this manifests itself in an installed assembly, comprising the mounted assembly, that rolls over the ground without deformation such as to form a contact patch. Ultimately, it corresponds to the acceleration that the sensor would experience if it were mounted on the tyre casing with the latter rotating freely about its natural axis of rotation.

The reference acceleration $\gamma^{reference}$ is therefore simply the centrifugal acceleration that is experienced by the sensor when mounted on a freely rotating tyre casing. The following two parameters are thus required to identify the reference acceleration: the radial position $R_C$ of the sensor with respect to the natural axis of rotation, and the rotational speed W of the tyre casing to which the sensor is fastened.

According to a second embodiment, the reference acceleration $\gamma^{reference}$ is determined based on the mean value of the wheel-revolution signal $Sig^{TdR}$.

Specifically, the method assumes that, in its state freely rotating at the rotational speed W, the tyre casing or any sensor attached thereto, experiences a centrifugal acceleration that is proportional to its radial position with respect to the natural axis of rotation. When placed under load via compression of the tyre casing against firm ground, the tyre casing deforms in such a way as to distribute the deformation energy generated by this load between two situations. The first situation corresponds to the condition regarding the movement required by the contact patch, which has a tendency to decrease centrifugal energy. The other situation corresponds to the condition regarding the energy delivered to the tyre casing outside of the contact patch. The delivered energy is the complement of the decrease in centrifugal energy corresponding to the first situation. As a result, the mean value of the wheel-revolution signal, over an integer number of wheel revolutions, whether or not the tyre casing is subjected to a load Z, corresponds to the centrifugal acceleration experienced by the sensor.

Preferably, having locked the phase of the wheel-revolution signal $Sig^{TdR}$ with respect to an angular position of the tyre casing, a correction Corr is made to the wheel-revolution signal $Sig^{TdR}$ to take account of the effect of the Earth's gravity.

The correction for the Earth's gravity allows the error in the deformation of the tyre casing to be minimized, in particular at low rotational speeds W. Specifically, the sensor, when the tyre casing is rotating, revolves about the natural axis of rotation. Since the signal output by the sensor is proportional to radial acceleration, it will be tainted by the Earth's gravity. Over one wheel revolution, the Earth's gravity will generate a sinusoidal signal of amplitude g that is dependent on the altitude of the sensor in the Earth's frame of reference. It is therefore necessary to remove this parasitic signal Corr from the first signal $Sig^i$, this requiring the first signal $Sig^i$ to be synchronized with respect to an angular position of the tyre casing.

Of course, the higher the rotational speed W of the tyre casing, the more the centrifugal acceleration experienced by the sensor becomes predominant with respect to this parasitic signal.

Very advantageously, the time interval T between two evaluations of the reference quantity $V^{reference}$ is less than or equal to 10 minutes, preferably less than or equal to 5 minutes, and very preferably less than 2 minutes.

The simplicity of the method is partly based on this time interval T: the greater it is, the fewer computations need to be performed in the integrated electronic device, this allowing energy to be saved. However, the quality of the estimate need not be sacrificed to save energy. As the general idea is to obtain a distance travelled in one day, one week, one month or during the life of the tyre casing, it is not necessary to have an exact measurement at any one given time. Specifically, if, statistically, the result is correct on the desired time scale, the objective is achieved. To this end, one measurement every 10 minutes allows a correct daily estimate to be obtained. However, it is necessary to decrease this time interval T to 5 minutes to make the profile of use of the tyre casing irrelevant. Lastly, in order to be precise for an evaluation on the scale of a few hours, it is necessary to decrease the time interval to 2 minutes. However, it is not necessary for the time interval to be less than 30 seconds to improve the quality of the estimate of the total distance travelled on a time scale of at least one hour of use of the tyre casing. For a standard use of the tyre casing, no significant further improvement in precision may be achieved by using a time interval of less than 30 seconds.

Now, the tyre casing defining a rolling radius $R_P$, the function A is proportional to the following ratio B:

$$B = \frac{R_P}{\sqrt{R_c}} \qquad \text{[Math 7]}$$

Specifically, the function A may be defined by the ratio B between the rolling radius $R_P$ and the radius $R_C$ of the sensor position. These two radii are determined with respect to the natural axis of rotation of the mounted assembly. However, the radius $R_P$ is evaluated in the loaded state of the tyre casing whereas the positioning radius $R_C$ is determined in the unloaded state of the mounted assembly. Of course, the proportionality between the function A and the ratio B may be unity or another parameter.

Very specifically, the rolling radius $R_P$ is dependent on the load Z borne by the tyre casing.

Although, when the tyre casing is mounted on a rim, of a predefined diameter and of a predefined width, and is possibly under a percentage of the maximum nominal load indicated by its load index, and possibly inflated to the recommended pressure, the value of the radius of the tyre casing compressed against a planar piece of ground may be set to a nominal $R_P$ value; the value of the rolling radius $R_P$ actually varies with the load Z borne. However, to a first approximation the variation in the rolling radius with respect to the actual value of the rolling radius $R_P$ may be neglected; it is thus enough either to employ a representative quantity or to take into account its variation via a load dependency applied at the moment of each measurement.

Very specifically, the tyre casing being inflated to an inflation pressure P, the rolling radius $R_P$ and the radial position $R_C$ are dependent on the inflation pressure P of the tyre casing.

Similarly, in the case of an inflated tyre casing, the rolling radius $R_P$ and the positioning radius $R_C$ may be influenced by the inflation pressure of the tyre casing. In this case, optionally, it may be necessary to take the variation in these two radii with inflation pressure into account in order to increase the precision obtained over the distances travelled by the tyre casing. To a first approximation, the inflation pressure determined by applying the rules of the ETRTO may be employed to obtain a highly satisfactory first estimate of the distances travelled in total.

Very specifically, the rolling radius $R_P$ is dependent on the total distance $D_f$ travelled by the tyre casing.

The rolling radius $R_P$ varies as a result of the natural wear of the tread. The wear of the tread is to the first order proportional to the total distance $D_f$ travelled by the tyre casing. Thus, taking this dependency into account improves the accuracy of the evaluation of the distance travelled. It is necessary to take into account, for example, its variation via a set dependency on the total distance travelled over long periods of time, much longer than the time interval T between two measurements. However, to a first approximation the variation in the rolling radius $R_P$ with respect to the actual value of the rolling radius $R_P$ may be neglected; it is thus enough either to employ a quantity representative of the rolling radius $R_P$ as above.

According to one specific embodiment, the first signal $Sig^i$ is acquired at a constant sampling frequency.

If samples are taken regularly, since variations in the rotational speed W of the mounted assembly are small over a low number of wheel revolutions, a spatial discretization of the first signal $Sig^i$ that is virtually constant spatially is obtained. Thus, the method is robust, given that the reference quantity $V^{reference}$ is the mean value of a wheel-revolution segment the samples of which are spatially distributed. In addition, this constant sampling is easy to implement in the electronic device integrated into the tyre casing.

According to an advantageous embodiment, the spatial discretization of the sampling of the first signal $Sig^i$ is less than 10 degrees, preferably less than 6 degrees, and very preferably less than 3 degrees.

Although not essential, it is preferable for the spatial discretization of the acceleration of the revolving wheel to be minimal in order to make it possible to identify, under the normal rolling conditions of the mounted assembly, the contact patch, i.e. the region of the tyre casing that makes contact with the ground. In particular, if the length of the signal $Sig^i$ is large, this information allows the increments demarcating the passage through the contact patch to be identified indirectly. Of course, the finer the spatial discretization of the first signal $Sig^i$, the more precise the detection and the shorter the required length of the first signal. It is then possible to obtain a very good evaluation of the reference quantity $V^{reference}$ over a single wheel revolution or over a low number of wheel revolutions. Thus, the length of the first signal $Sig^i$ is always about the same with two ways of measuring: either over a low number of wheel revolutions with a high discretization, or over a high number of wheel revolutions with a low or medium spatial discretization. Both solutions yield a correct evaluation of the distances travelled provided that at least one wheel revolution is completed.

For example, if the desire is for the distance travelled by the tyre casing to be evaluated in the wheel-tyre assembly, then the sensor needs to be associated with an electronic unit comprising a microcontroller, a memory space, a battery and a clock. The spatial discretization envisaged with a constant sampling frequency then allows elementary operations to be performed in the microcontroller, minimizing battery consumption. In addition, the minimal discretization of the order of 36 points per wheel revolution makes it possible to limit the number of operations and transfers to the memory space. Even so, the precision obtained as regards the deformation of the tyre casing remains good while the battery of the electronic unit is saved. That means that only intermediate scalar values of the method need to be stored or transferred.

BRIEF DESCRIPTION OF THE DRAWINGS

The invention will be better understood on reading the following description, which relates to the case of application to pneumatic tyres. This application is given solely by way of example and made with reference to the attached drawings in which.

DETAILED DESCRIPTION OF EMBODIMENTS

Figure 1:
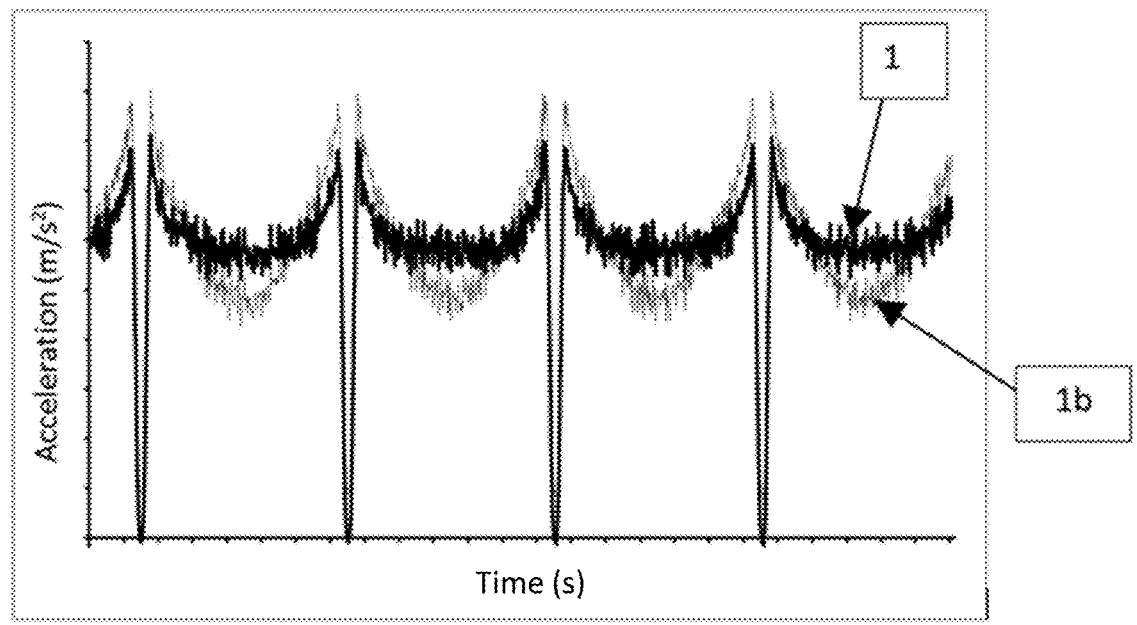
FIG. 1 shows an example of first signals $Sig^i$ according to two embodiments of the method.

In order to implement the invention, a tyre casing has to be equipped with an electronic unit comprising a sensor, a microcontroller, a clock, a memory space and an energy storage means, and radio frequency communications means capable of transmitting and possibly of receiving. The tyre casing comprises a crown, two sidewalls and two beads of revolution about a natural axis of rotation. The casing also comprises a median plane equidistant from the two beads, the intersection between the median plane and the natural axis of rotation defining a wheel centre.

The sensor is fastened to the tyre casing plumb with the crown, facing a protruding piece of material or a longitudinal groove, these being regions of uniform stiffness, in a radial position $R_C$ that remains constant with respect to the natural axis of rotation in its on-wheel mounted state. The sensor is able to generate at least one output signal proportional to the acceleration normal to the crown experienced by the sensor inside the tyre casing. In fact, this sensor may be a single-axis sensor, in which case it needs to be positioned radially. It may also be made up of a plurality of single-axis sensors. In that case, the orientation of each of the single-axis sensors needs to be clearly identified with respect to the frame of reference of the tyre casing so as to reconstruct the acceleration normal to the crown of the tyre casing. The sensor takes account of the continuous component of the acceleration. The sensor may be an accelerometer employing a piezoresistive or capacitive technology.

The electronic unit, which is powered by the energy storage means, is controlled by the microcontroller with the aid of the clock, said microcontroller also having installed in it computing algorithms that allow, for example, to reference quantity $V^{reference}$ of the tyre casing to be determined using the signals generated by the sensor element. The radiofrequency-communications transmission means are used to transmit the computed information, and the radiofrequency-communications reception means are used to receive operating instructions or information of use to the computing algorithms. Ideally, this electronic unit comprises or is associated with other measuring elements (such as means for evaluating inflation pressure, the temperature in the internal cavity of the mounted assembly, the state of wear of the tread, etc.) so that components may be shared and operating costs optimized.

Here, the sensor is turned on by the microcontroller when the tyre casing is under rolling conditions. Of course, it is possible to select for the rotational speed W a threshold value from which a signal output by the sensor is acquired. The electronic unit has available to it a memory space suitable for the type of analysis that it is desired to performed. In fact, the capacity of this memory space is predefined depending on how the electronic unit is to be used. It is the microcontroller that controls the storage of the values from the sensor in the memory space. In addition, the microcontroller is able to perform elementary mathematical and logic operations on a small number of data. If the mathematical and logic operations are more complex, or if the number of data to be manipulated becomes great, the microcontroller is replaced by a microprocessor. Lastly, the electronic unit is supplied with power by a storage means. The simplest storage means is a battery. However, a capacitor of large size rechargeable using a piezoelectric element could be envisioned.

The sampling frequency of the electronic unit allows a wide range of rotational speeds W to be covered with a spatial discretization of less than 10 degrees. According to one particular embodiment, the sampling frequency is adaptable on demand or in response to a signal such as, for example, the rotational speed W of the tyre casing.

Optionally, the electronic unit contains or is able to obtain the identification of the tyre casing. This information is useful with regard to selecting a set of data useful to the computing algorithms employed in the electronic unit. If the electronic unit needs to obtain the identification of the tyre casing or receive orders to take a measurement, the electronic unit is equipped with a radiofrequency reception means. This means operates in the low-frequency range, and ideally at the frequency of 125 kHz, so as to be free of the interference generated by the metal regions of the tyre casing and its nearby environment in the vehicle.

According to one specific embodiment, the electronic unit comprises radiofrequency transmission means, specifically transmitting in the UHF band (UHF standing for ultra-high frequency), and particularly in the vicinity of 433 MHz or 900 MHz or what is known as the BLE band (BLE standing for Bluetooth Low Emission), these being free frequency bands. In addition, the UHF band makes it possible to have small antenna sizes making the electronic unit easier to incorporate into the tyre casing.

This transmission communication is useful for transmitting the data of the method to the vehicle or to outside the vehicle. It is possible either to transmit the data string corresponding to the acquisition of the first signal $Sig^i$ or of the wheel-revolution signal $Sig^{TdR}$, or to transmit intermediate results that will have been computed in the electronic unit. The last two modes of transmission necessarily cost the electronic member less in terms of power because the flow of data is less substantial. Specifically, radiofrequency transmission consumes more power than mathematical and logic operations.

FIG. 1 shows a first raw signal 1b in grey corresponding to the acceleration normal to the crown of a truck tyre casing rotating at a constant rotational speed W. Regularly, and periodically, the curve 1b passes through a low, near-zero value. This periodic phenomenon corresponds to the sensor passing through the contact patch of the tyre casing. The transition between the sensor passing through the contact patch of the tyre casing and the other part of the tyre casing occurs sharply at falling or rising fronts depending on whether the sensor is entering or leaving the contact patch. In addition, it will be noted that the first signal 1b, on a scale of the order of one wheel revolution, follows a carrier wave, the first signal 1b oscillating about this carrier wave at a frequency higher than the frequency of wheel revolution. These oscillations correspond to the noise on the first signal 1b from the sensor, which noise is caused by the various unpredictable influences including the macroroughness of the road.

The curve indexed 1 in black represents the same accelerometer signal corrected only for the Earth's gravity, and which will be termed corrected first signal 1. The correction is here sinusoidal, the correction having being applied to a point located at the centre of the contact patch, i.e. at equal distance from the two edges that demarcate the portion of the signal the value of which is almost zero. It may be seen that the first signal 1 is flatter between the regions characterizing the contact patch. Although not essential, it is preferable for the various steps of the method to be performed on this corrected first signal 1.

Figure 2:
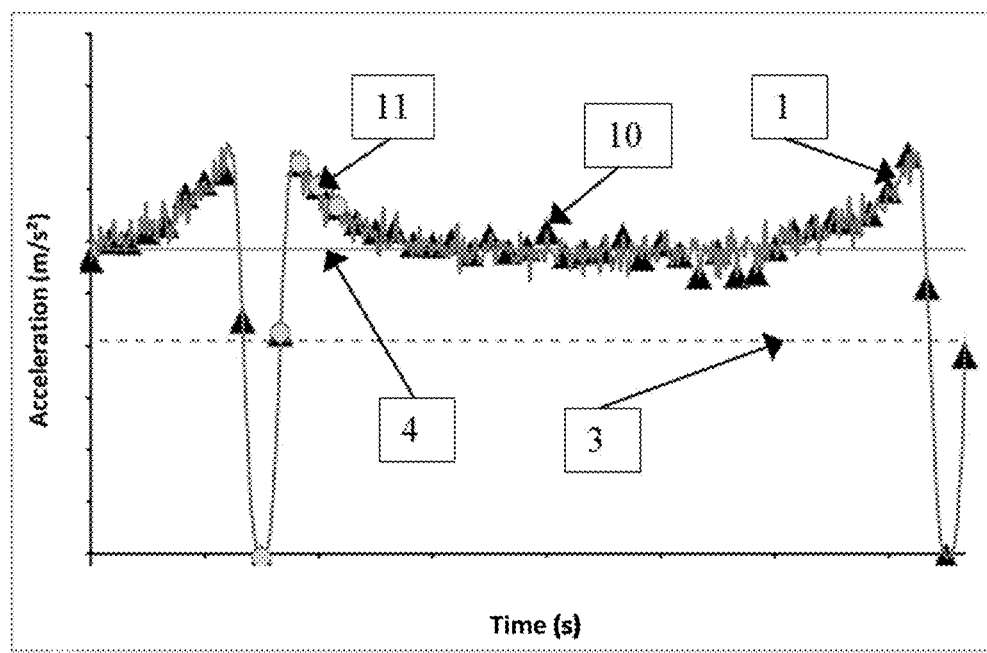
FIG. 2 shows a plurality of first signals $Sig^i$ of the method, depending on the sampling frequency and the length of the signal.

FIG. 2 illustrates the impact of the spatial discretization and the length of the first signal $Sig^i$ on the reference acceleration value $\gamma^{reference}$ on which the reference quantity $V^{reference}$ is based and the method for evaluating the distance D and $D_f$ travelled by the tyre casing. Thus, the continuous curve in dark grey shows a first signal referenced 1 corresponding to the normal acceleration corrected for gravity with an angular step of one degree extending over a plurality of wheel revolutions, the representation of which has been deliberately limited to approximately one revolution. The average value of this signal, which by definition tends towards the reference acceleration $\gamma^{reference}$, has been represented by the continuous straight line 4. Whether the signal is corrected for gravity or not, the same average value would have been obtained over an integer number of wheel revolutions. This value is used as a gauge, and it is equal to 100 by default.

A second first signal $Sig^i$, represented by the black triangles referenced 10, corresponds to the same signal 1; however, in this case the spatial discretization of the signal is 10 degrees. It is possible to restrict the length of this signal to a single wheel revolution by combining samples located at the near-zero value, in order to form a wheel-revolution signal $Sig^{TdR}$. This signal 10 teaches us that this level of spatial discretization allows, at the very least, the accelerometric signal to be isolated to one wheel revolution since one sample will necessarily have an almost zero value per contact patch, allowing this event to be detected under the standard conditions of use of a conventional tyre casing. Of course, beyond this maximum angular discretization, the passage of the sensor through the contact patch could potentially not be identifiable using the accelerometric signal. If consideration is limited to one complete wheel revolution $Sig^{TdR}$, a mean value of this signal equal to 99% of the value of the reference acceleration $\gamma^{reference}$ is obtained, this being highly satisfactory.

Lastly a third first signal $Sig^i$ represented by the light-grey circles and referenced 11 corresponds to the same signal 1; however, in this case the spatial discretization of the signal is 10 degrees and sampling is limited to the first five increments, i.e. to a fraction of one wheel revolution. In FIG. 2, the straight dashed line referenced 3 represents a threshold N. Here, the threshold N corresponds to fifty percent of the maximum value of the accelerometric signal over more than one revolution without correction for gravity. It will be noted that few of the points of the signals 10 and 11 are below this threshold N. Furthermore, the length of the signals 10 and 11 is chosen so that at least 60 percent of the length of the signal is located above this threshold N. In the case of the signal 11, precisely 60 percent of the length of the signal 11 is located above this threshold since the length of the signal 11 is equal to 5 and two values are below this threshold N (representing 40% of the signal). In this case, the mean value of the signal 11 is equal to 90% of the reference acceleration $\gamma^{reference}$ this being satisfactory as a valid estimate of the distance travelled may be obtained therewith. If this signal 11 had been limited to the first four values, in which case the condition regarding the length of the signal above N would not have been met, the mean value would have fallen to 79 percent of the reference acceleration. Furthermore, if the last four values of the signal 11 had been used, in which case the condition with respect to the threshold N would have been met, the average value would have been 110 percent of the reference acceleration, this still being highly satisfactory. Likewise, it will be noted that a modification of the threshold N would not have changed the result much. However, this threshold N must be carefully selected if the raw accelerometric signal not corrected for gravity is used, as then, because of the value of gravity, the signal might not pass through zero.

Figure 3:
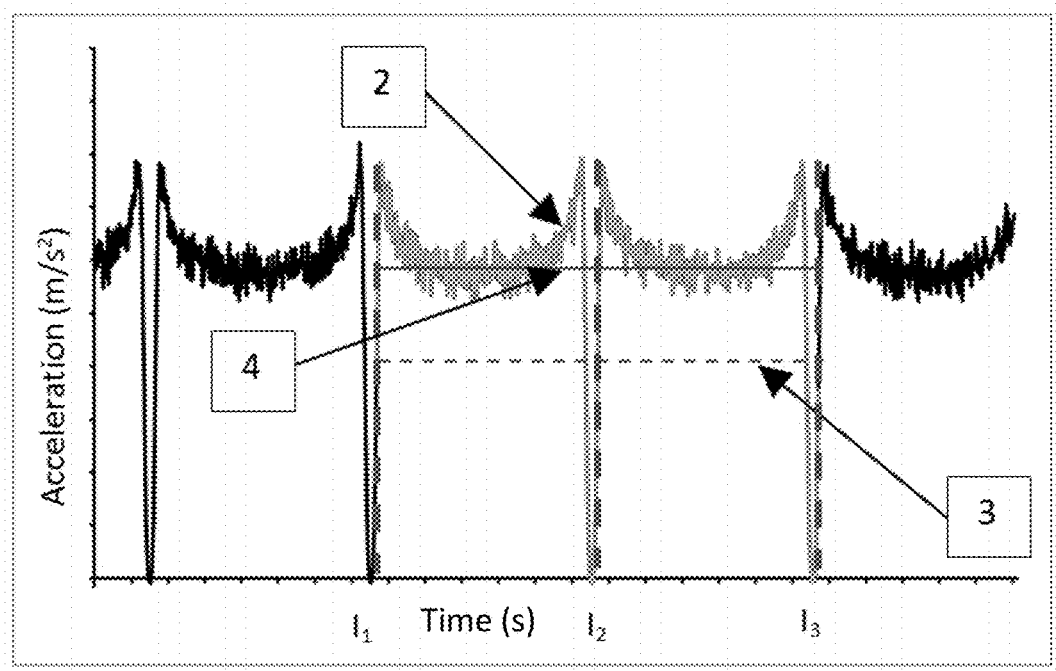
FIG. 3 shows the wheel-revolution signal $Sig^{TdR}$ and its identification with a first embodiment.

FIG. 3 shows the method for determining a wheel-revolution signal $Sig^{TdR}$ (referenced 2 in the figure) over an integer number of wheel revolutions. From the first signal $Sig^i$, here corrected to allow a better explanation of the example, a threshold E, illustrated by the dashed line 3, is determined. Here, the threshold E is set to half the maximum amplitude of the first signal $Sig^i$ without any corrections. A series of increments I are identified, these being where the first signal $Sig^i$ crosses the dashed line 3, for example from below, which physically corresponds to the sensor, which rotates as one with the tyre casing, exiting from the contact patch. Thus, here, crossings from above of the threshold E by the first signal $Sig^i$, which correspond to entry into the contact patch, and which would have generated intermediate increments I, are neglected. The first signal $Sig^i$ is thus limited to a wheel revolution signal $Sig^{TdR}$ (referenced 2) between a first increment, here $I_1$, and a second increment, here $I_3$. The wheel-revolution signal $Sig^{TdR}$ here represents the accelerometric signal of the sensor over two complete wheel revolutions.

The threshold value E represented by the dashed line 3 has in this instance been evaluated in one portion of the first signal $Sig^i$ with a variable sampling frequency. The maximum discretized value obtained is extracted from this portion of the first signal 1 and named MAX. The threshold value E is therefore a value comprised between 10 and 50% of the value MAX, and in this instance this value is about 50%.

The mean value of the wheel-revolution signal $Sig^{TdR}$ (referenced 2) over a single revolution, which corresponds to the reference acceleration $\gamma^{reference}$ which has been represented by the continuous black line 4, is computed. It is evaluated in real time, by summing the values of the increments u of the first wheel-revolution signal $Sig^{TdR}$, the sum being divided, at the end of the wheel-revolution signal $Sig^{TdR}$, by the number of increments of the first wheel-revolution signal $Sig^{TdR}$. To do this, it is enough just to find the first crossing from below of the threshold E by the first signal, which determines the starting point of the wheel-revolution signal $Sig^{TdR}$. Of course, the computation may also be done after the whole recording of the wheel-revolution signal $Sig^{TdR}$ (referenced 2) has been recorded and stored in memory.

Figure 4:
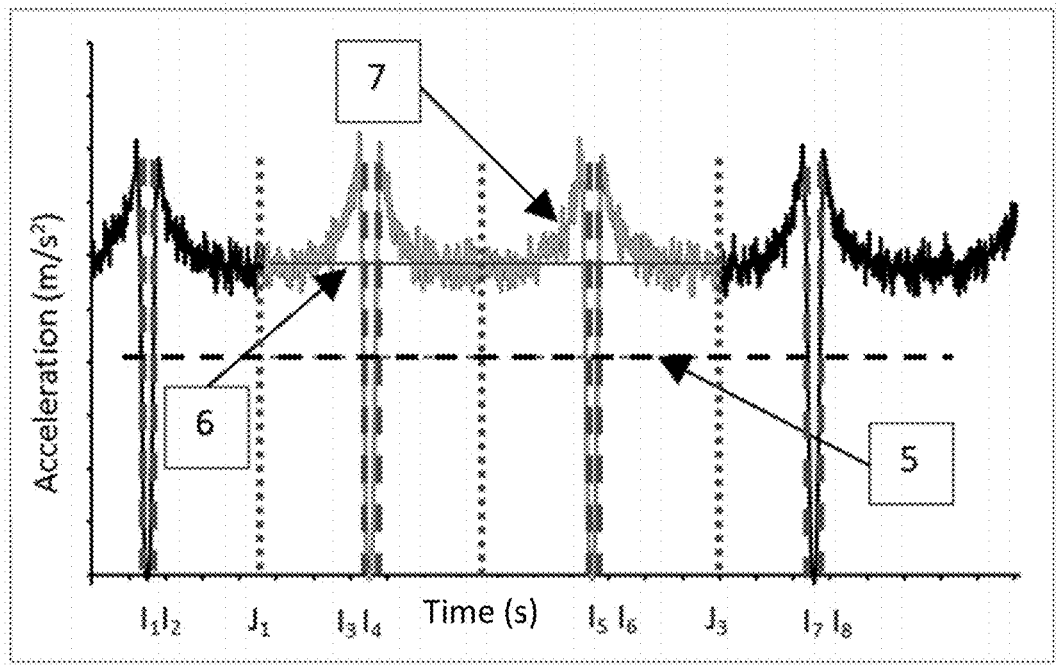
FIG. 4 shows the wheel-revolution signal $Sig^{TdR}$ and its identification with another embodiment.

FIG. 4 is an illustration of the wheel-revolution signal $Sig^{TdR}$ (referenced 7 and shown in grey) being demarcated from the accelerometric signal. Here, it is the second embodiment that is used for this demarcation.

From the signal delivered by the sensor, here corrected to allow a better explanation of the example, a threshold B, illustrated by the dashed line 5, is determined. A series of increments I is identified, these being where the first signal crosses the dashed line 5, which physically corresponds to the sensor, which rotates as one with the tyre casing, entering into or exiting from the contact patch. Next, considering only odd-numbered increments I in this illustration, a series of increments J located equidistantly from the odd-numbered increments I is constructed. These increments are identified by vertical lines of dots in FIG. 3. Of course, the method may be applied as long as the selected increments are between one eighth and seven eighths of the length of the signal comprised between the two increments $I_i$ and $I_{i+1}$.

The wheel-revolution signal $Sig^{TdR}$ (referenced 7) is then demarcated between a first increment, here J1, and a second increment, here J3. The wheel-revolution signal $Sig^{TdR}$ (referenced 7) here represents the accelerometric signal delivered by the sensor over two complete wheel revolutions.

The threshold value B, which has been represented by the dashed line 5, has in this instance been evaluated in one portion of the accelerometric signal, with a variable sampling frequency. From this portion of the accelerometric signal, the obtained discretized maximum value, which is called MAX, is extracted. The threshold value B is therefore a value comprised between 10 and 50% of the value MAX, and in this instance this value is around 50%.

The reference acceleration $\gamma^{reference}$, which has been represented by the continuous line 6 in black, is determined by computing the mean value of the first wheel-revolution signal $\text{Sig}^{TdR}$ (referenced 7). It is evaluated in real time by summing the values of the increments u of the wheel-revolution signal between the increments J1 and J3, the sum then being divided, at the end of the wheel-revolution signal, by the number of increments u in the wheel-revolution signal $\text{Sig}^{TdR}$ (referenced 7).

This second embodiment is the better method because the discretization errors at the extremities of the wheel-revolution signal $\text{Sig}^{TdR}$ cause only a small variation in the computation of the reference acceleration. Specifically, at these extremities, the sensitivity of the signal is low with respect to the sensitivity of the signal level with the increments I.

Figure 5:
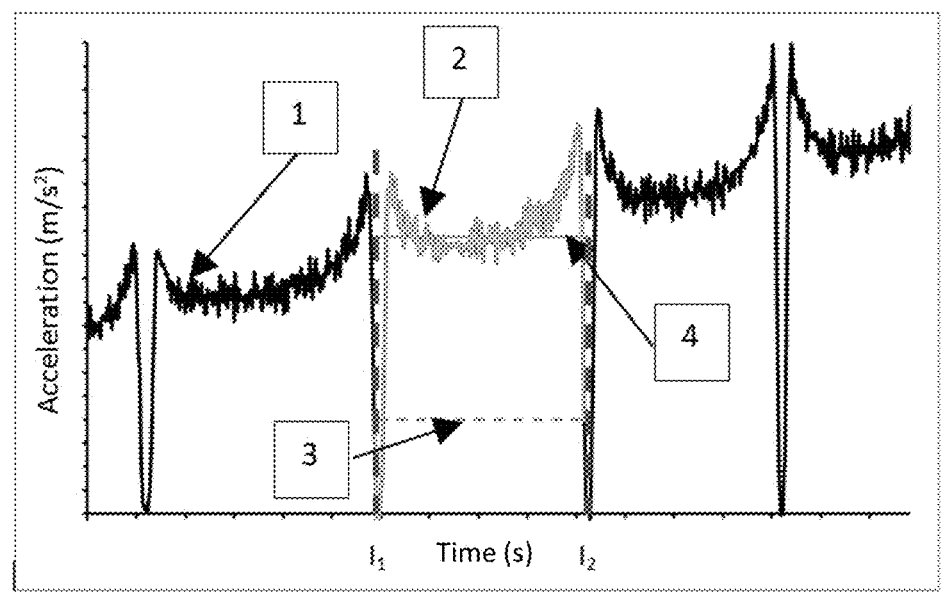
FIG. 5 shows the wheel-revolution signal $Sig^{TdR}$ when rotating at a variable rotational speed W.

FIG. 5 shows an accelerometric signal, previously corrected for the Earth's gravity and corresponding to the acceleration normal to the crown of a truck tyre casing rotating at a variable rotational speed W.

Here, a threshold E, represented by the dashed line 3, is determined for the wheel-revolution signal $\text{Sig}^{TdR}$ (shown in light grey and referenced 2).

The threshold value E makes it possible to identify increments I, which for example correspond to the sensor exiting from the contact patch. In this analysis, the wheel-revolution signal $\text{Sig}^{TdR}$ is limited to one wheel revolution, as this is preferable in order to limit the errors associated with the variation in the rotational speed W of the tyre casing. The threshold E was chosen to correspond to half the reference acceleration of the first signal demarcated over an integer number of wheel revolutions before the wheel-revolution signal 2. The reference acceleration $\gamma^{reference}$ is also determined, from the wheel-revolution signal 2, by computing the mean value of the wheel-revolution signal 2, which has been illustrated by the continuous curve referenced 4.

It will also be noted that, because the rotational speed W is variable, here in an acceleration phase, the period associated with the wheel revolution decreases, resulting in increasingly closely-spaced rising edges or falling edges.

Figure 6:
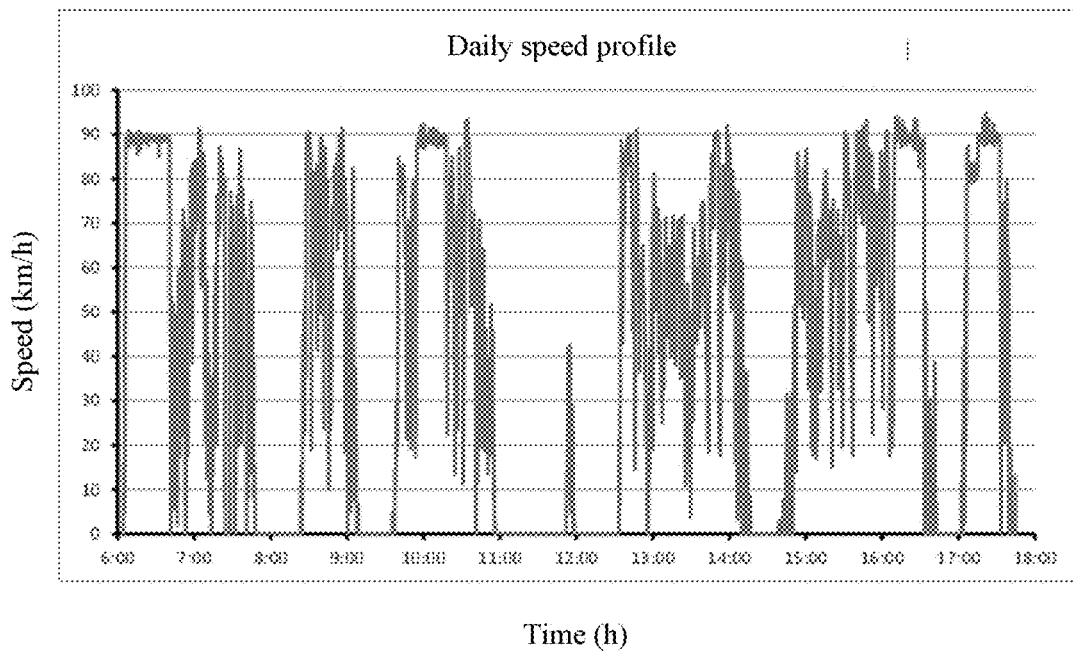
FIG. 6 shows the speed profile of a road vehicle in daily use.

FIG. 6 is an illustration of the speed profile of a truck in regional use in Europe. The vehicle was equipped with a mounted assembly comprising a sensor according to the invention, the assembly being mounted at the front of the vehicle. The response of the sensor was recorded at regular time intervals T of the order of one minute. During a measurement phase, the sampling frequency of the sensor was chosen so that the conditions of signal length and of minimum angular step size were met in the entire use-related range of speeds. The daily distance travelled was estimated in the integrated device with a measurement frequency of 1 minute. To do this, the function A was chosen to be the ratio B. The rolling radius $R_P$ and the positioning radius $R_C$ of the sensor were calibrated beforehand on a testbed under loaded and unloaded conditions by applying the rules of the ETRTO. Moreover, the signals were stored in an external memory space, which made it possible to modify the time interval T between the measurement phases and thus carry out other evaluations. Moreover, the mileage covered by the vehicle during the day was recorded directly by the speedometer of the vehicle and via a commercially available GPS device.

Figure 7:
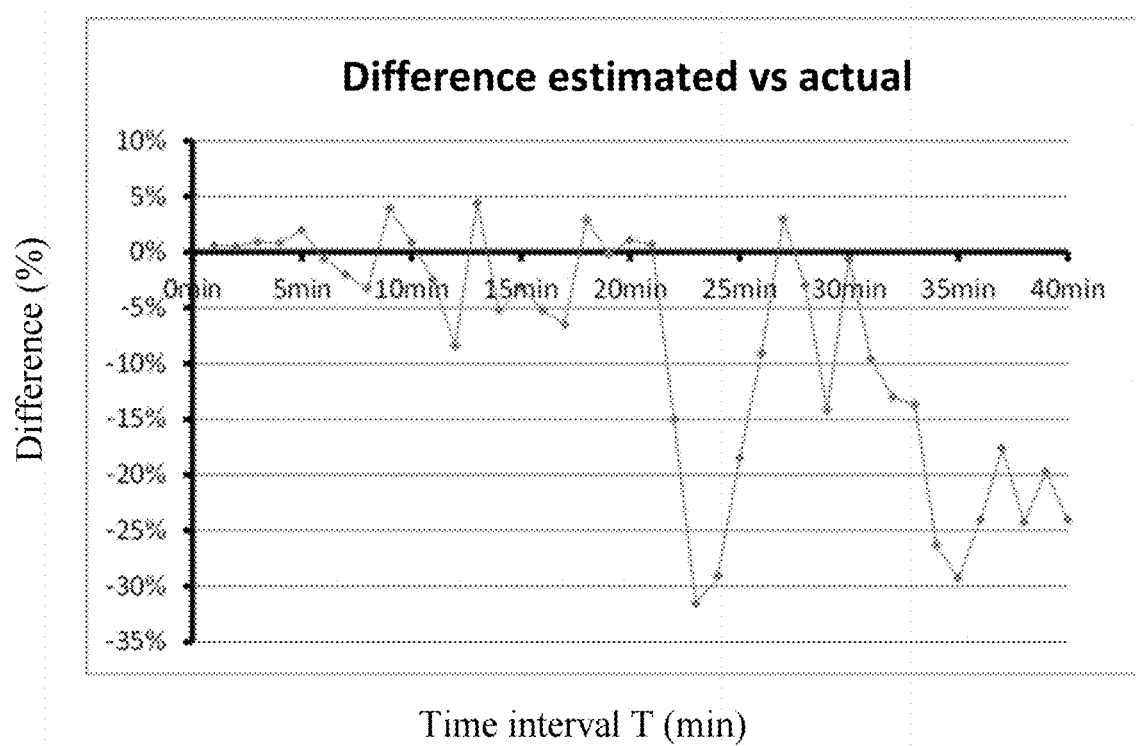
FIG. 7 shows differences in daily distances travelled on the one hand as evaluated by the method and on the other hand as measured in the vehicle, as a function of the time interval T of the method.

FIG. 7 is a summary of the differences between the mileage recorded by the vehicle and various evaluations of the method that differed only in the time interval T between the measurement phases, which was varied from 1 minute to 40 minutes in steps of 1 minute. The first evaluation at 1 minute was that of the device integrated into the mounted assembly. The other evaluations were made by eliminating raw data to increase the time interval T between the measurements. Here, in a given evaluation of daily distance travelled, the time interval T remained constant.

It will be noted that if the time interval T is less than 10 minutes, the difference in distance between the distance recorded by the vehicle and the distance evaluated by the method does not exceed 5 percent. If, for this specific itinerary, the time interval is set to 20 minutes; the error in the estimate still does not exceed 10 percent. In addition, the shorter the time interval T, the smaller the difference between the reference value recorded by the vehicle and the evaluation made according to the method. The error is even insignificant below a value of 5 minutes for the time interval T between the measurement phases.

The invention claimed is:

1. A method for obtaining a total distance travelled by a tire casing of a tire, the tire casing in a state mounted on-wheel in order to form a mounted assembly, the tire casing having a crown equipped with a tread able to make contact with a ground, two sidewalls and two beads of revolution about a natural axis of rotation and a median plane, an intersection of the median plane and of the natural axis of rotation defining a wheel center, comprising the following steps:

fastening to the tire casing at least one sensor having a radial position $R_C$ with respect to the natural axis of rotation in the on-wheel mounted state and able to generate at least one output signal proportional to an acceleration experienced by the sensor in the tire casing;

placing the mounted assembly under conditions in which it may rotate at a rotational speed W and is loaded with a load Z;

acquiring, after a time interval T, a first signal $\text{Sig}^i$ comprising at least an amplitude of the acceleration in a direction normal to the crown, values of the first signal $\text{Sig}^i$ less than a threshold N representing less than 40 percent of a length of the first signal $\text{Sig}^i$;

identifying a first reference quantity $V_i^{reference}$ defined as a square root of a mean value of the first signal $\text{Sig}^i$;

determining the distance D travelled during the time interval T using the following formula:

$$D = A * T * V_i^{reference},$$

where A is dependent on the tire casing, and at least proportional to a square root of a rolling radius corresponding to a smallest distance between the wheel center and the ground under loaded conditions;

performing an evaluation of a wear or an aging of the tire casing based on the total distance travelled to determine that the tire casing needs to be replaced; and replacing the tire casing based on the evaluation of the wear or the aging of the tire casing based on the total distance travelled.

2. The method according to claim 1, wherein, the time interval T remaining the same between each measurement, the first reference quantity $V_i^{reference}$ takes a set value $V^{set}$, and a total distance $D_f$ travelled by the tire casing is determined using the following formula:

$$D_f = T * \Sigma_{i=0}^{n} (A * V_i^{reference}).$$

3. The method according to claim 2, wherein, a function A being a constant, the total distance $D_f$ travelled is determined using the following formula:

$$D_f = T * A * \Sigma_{i=0}^{n} V_i^{reference}.$$

4. The method according to claim 1, wherein the first signal $\text{Sig}^i$ is demarcated over a number $N_{TdR}$ of wheel revolutions, $N_{TdR}$ being greater than or equal to 1, in order to construct a wheel-revolution signal $Sig^{TdR}{}_i$, and the first reference quantity $V_i^{reference}$ is a square root of the mean value of the wheel-revolution signal $Sig^{TdR}{}_i$ over one revolution.

5. The method according to claim 4, wherein, having identified a first series of increments I corresponding to an abscissa u of at least a first signal $Sig^i$ where the first signal $Sig^i$ crosses a threshold value B, the first signal $Sig^i$ is demarcated between a first increment $I_{min}$ and a second increment $I_{max}$ with max equal to min+2*k, k being a strictly positive natural integer, over an integer number $N_{TdR}$ of wheel revolutions defined by the formula:

$$N_{TdR} = \frac{(\max - \min)}{2}.$$

6. The method according to claim 5, wherein the first series of increments I is identified using the following steps:
defining the threshold value B, which is a value between 0.1 and 0.5 of the at least one maximum of at least one portion of the first signal $Sig^i$;
determining a second signal of abscissa u depending on the at least one portion of the first signal $Sig^i$ and the threshold value B; and
identifying the first series of increments I corresponding to the abscissa u of the at least one portion of the first signal $Sig^i$ where the second signal crosses a threshold E.

7. The method according to claim 5, wherein identification of the increments comprises the following steps:
creating a second series of increments J corresponding to a median abscissa u between the abscissae u of increments I of consecutive and identical parities; and
constructing the wheel-revolution signal $Sig^{TdR}{}_i$ between a first increment $J_{min}$ and a second increment $J_{max}$, min and max being of same parity.

8. The method according to claim 1, wherein the first signal $Sig^i$ is acquired if the rotational speed W of the tire casing is greater than a threshold $W_{threshold}$ defined by the following formula:

$$W_{threshold} = \frac{12}{\sqrt{Dev}},$$

where Dev is a distance travelled by the tire casing in one revolution.

9. The method according to claim 1, wherein the time interval T between two evaluations of the first reference quantity $V_i^{reference}$ is less than or equal to 10 minutes.

10. The method according to claim 1, wherein, the tire casing defining a rolling radius $R_p$, a function A is proportional to the following ratio B:

$$B = \frac{R_P}{\sqrt{R_c}}.$$

11. The method according to claim 10, wherein the rolling radius $R_P$ is dependent on the load Z borne by the tire casing.

12. The method according to claim 10, wherein, the tire casing being inflated to an inflation pressure P, the rolling radius $R_P$ and the radial position $R_C$ are dependent on the inflation pressure P of the tire casing.

13. The method according to claim 10, wherein the rolling radius $R_P$ is dependent on the total distance travelled by the tire casing.

14. The method according to claim 1, wherein the first signal $Sig^i$ is acquired at a constant sampling frequency.

15. The method according to claim 1, wherein a spatial discretization of sampling of the first signal $Sig^i$ is less than 10 degrees.

* * * * *